United States Patent
Wakui

[19]

[11] Patent Number: 5,813,039
[45] Date of Patent: Sep. 22, 1998

[54] GUEST EXECUTION CONTROL SYSTEM, METHOD AND COMPUTER PROCESS FOR A VIRTUAL MACHINE SYSTEM

[75] Inventor: Fujio Wakui, Odawara, Japan

[73] Assignee: Hitachi, Ltd., Tokyo, Japan

[21] Appl. No.: 566,177

[22] Filed: Dec. 1, 1995

[30] Foreign Application Priority Data

Dec. 2, 1994 [JP] Japan .................................. 6-329400

[51] Int. Cl.$^6$ .................................................. G06F 12/08
[52] U.S. Cl. ........................................................ 711/156
[58] Field of Search ................................... 395/483, 800; 711/156

[56] References Cited

U.S. PATENT DOCUMENTS

| | | | |
|---|---|---|---|
| 4,135,240 | 1/1979 | Ritchie .................................. | 395/491 |
| 4,710,894 | 12/1987 | Kube et al. ............................ | 395/417 |
| 5,003,468 | 3/1991 | Watanabe et al. ..................... | 364/200 |
| 5,101,346 | 3/1992 | Ohtsuki .................................. | 395/800 |

OTHER PUBLICATIONS

Handy Jim, "The Cache Memory Book", Academic Press, Inc., pp. 15 (Figure 1.7) and 22 (Figure 1.10), 1993.

*Primary Examiner*—Tod R. Swann
*Assistant Examiner*—Felix B. Lee
*Attorney, Agent, or Firm*—Antonelli, Terry, Stout & Kraus, LLP

[57] ABSTRACT

A guest execution control system method and computer process for a virtual machine system having a main storage for holding a state descriptor of a guest virtual machine, and a plurality of instruction processors each starting execution of the guest virtual machine by executing an execution start instruction for the guest virtual machine. Execution instruction information in the state descriptor indicating whether execution of the guest virtual machine is to be finished is changed when a state of the virtual machine satisfies a predetermined condition during execution of the guest virtual machine. The execution instruction information is held at an address in the main storage. The guest execution control system includes a circuit which compares an address in the main storage of information being changed with the address in the main storage of the execution instruction information, and informs the guest virtual machine being executed that the execution instruction information has been changed when the address in the main storage of information being changed is the same as the address in the main storage of the execution instruction information. The guest execution control method and computer process performs the comparing and informing operations for the virtual machine system.

37 Claims, 6 Drawing Sheets

GUEST EXECUTION CONTROL SYSTEM, METHOD AND COMPUTER PROCESS FOR A VIRTUAL MACHINE SYSTEM

BACKGROUND OF THE INVENTION

The present invention relates to a virtual machine system. More particularly the present invention relates to a guest execution control system method and computer process for accelerating a guest instruction processing by automatically informing a guest virtual machine being executed when execution instruction information of a state descriptor corresponding to the guest virtual machine has been changed.

In a virtual machine system, as shown in Japanese Patent Laid-Open No. Sho 57-212680 (1982), after a virtual machine execution start instruction (hereinafter, a SIE instruction) has been executed in a host virtual machine control program (hereinafter, VMCP), operation of a virtual machine (hereinafter, VM) is started.

FIG. 2 illustrates the instruction format of the SIE instruction. The SIE instruction 60 designates a virtual machine state descriptor 61 (hereinafter, SD) that is positioned in a main storage (hereinafter, MS) by its B2 and D2 fields as an operand. An instruction execution unit in a central processing unit (hereinafter, CPU) sets respective fields of the SD from the MS to hardware resources of the CPU by decoding the SIE instruction and operates the CPU as a guest VM.

The hardware resources set at this time include guest mode latches, program state words (PSW), control registers (CR), general registers (GR), prefix and MS extent registers and the like. That is, the SD describes the architecture of the guest VM in view of the guest instruction. While the hardware resources are set as described above, the state of a host is held in the CPU.

The guest VM started by the SIE instruction emulates guest programs until an interruption or an interception is caused. The interruption is a case which necessitates the processing of the host such as input or output interruption or external interruption. The interception is a case which is caused during execution of the guest VM necessitating, for example, the processing of the host. In a portion of a privileged instruction, it is possible to designate whether the interception is to be allowed or not by an interception mask field in the SD. When an interruption or interception is caused, execution by the guest VM is stopped and the CPU is placed in a host mode. Subsequently the CPU is restored to the state of executing the SIE instruction.

Meanwhile, in the virtual machine system all or portions of IO processing of the guest VM is simulated by the VMCP. That is, when an IO start instruction is designated in the guest program, the guest VM is stopped and the interception is reported to the VMCP.

The VMCP simulates the IO start instruction in the guest program and starts an IO processing with regard to an actual input/output device. The VMCP receives an IO interruption request corresponding thereto in accordance with an IO mask of the host.

The VMCP holds a guest IO interruption until the IO mask of the guest is ON and causes the IO interruption of the guest at a time point when the IO mask of the guest is ON. A similar processing is performed with regard to a portion of the external interruption of the guest. Hereinafter, an operation in which the guest interruption received by the VMCP is informed to the guest and held until the mask of the guest is made ON, is called an "interruption request".

In the virtual machine system, an interruption request field forming part of execution instruction information is provided in the SD as shown in FIG. 2 to hold the above-described guest interruption in the VMCP. The interruption request field includes a plurality of bits corresponding to respective interruption factors to be held. More particularly, the interruption request field includes IO interruption request bits corresponding to the IO interruption, external interruption request bits corresponding to the external interruption and the like.

FIG. 3 illustrates a flowchart of processing in a first conventional technology in case where an IO interruption is held by the VMCP. In step 28, the VMCP receives an IO interruption request of a specified guest VM (indicated as Guest 1). In step 29, the VMCP holds the received guest IO interruption request by setting "1" in an IO interruption request bit in the interruption request field in SD of the Guest 1. Thereafter, the VMCP continues the processing and issues a SIE instruction and starts Guest 1 in step 30.

In case where the IO interruption request bit of SD is "1", the guest VM is stopped at a time point when an IO mask (indicated as GPSW (IO)) of a guest PSW becomes "1" and reports the interception to VMCP.

That is, the execution of Guest 1 is started in step 31 and the guest instruction processing is executed since GPSW (IO)=0. Step 32 shows that GPSW (IO) is changed from "0" to "1" by one of a LPSW (Load PSW) instruction, STOSM (Store Then OR System Mask) instruction, or SSM (Set System Mask) instruction, etc. At this time point the condition of the interception is established, the guest instruction processing is stopped and the interception is reported to VMCP (step 33). The VMCP simulates the IO interruption of the Guest 1 (step 34) and starts again Guest 1 (step 35). The Guest 1 restarts the processing from an IO interruption handler as if it received the IO interruption in the guest VM. Step 37 is an unnecessary step in the above-described first conventional technology. However, step 37 is necessary in the other conventional technology to be described below.

In a case where the VMCP holds a guest external interruption the operation is similar to the above-described case where an IO interruption is held by the VMCP therefore, an explanation will be given only of a case where a guest IO interruption occurs below.

As shown in step 32 of FIG. 3, it is necessary to determine whether the guest VM is to be stopped by the interception or is to be continued, in accordance with the presence or absence of the IO interruption request in an instruction of changing a system mask of the guest VM, in case where GPSW (IO) is changed from "0" to "1". FIG. 4 illustrates a flowchart of a conventional processing of an LPSW instruction. The same processing is applicable to other system mask change instructions.

First, the presence or absence of access exceptions and designation exceptions is checked in step 74, and an interruption processing is performed in step 83 in case where there is an exception factor. In case where there is no exception factor, a flag is initialized (step 75) and in a case where GPSW (IO) to be newly set is "1" (step 76), an interruption request field is read from the SD of the guest VM (step 77). When a value of an IO request bit in the read interruption request filed is "1" (step 78), a flag is set to "1" (step 79). By the above procedure a flag becomes "1" when the condition to cause the interception is established by the IO interruption request. Next, the PSW is set (step 80), the interception is performed when the value of flag is "1" (steps 81 and 82) and the processing of the LPSW instruction is finished when the flag is "0".

Generally, an occurrence frequency of the IO interruption request is sufficiently smaller than an occurrence frequency of the LPSW instruction and a function in a case where the operation is normally finished, is required in the LPSW instruction of the guest. That is, steps 74→75→76→80→81→84 or steps 74→75→76→77→78→80→81→84 are the main path of such a processing.

In the above procedure steps for reading the interruption request field and for checking the IO interruption request bit are added to an LPSW instruction processing of the host and these steps constitute an overhead in processing the guest instruction.

A second conventional technology, as shown in Japanese Patent Laid-Open No. Sho 63-279328 (1988) corresponding to U.S. Pat. No. 5,003,468, discloses that a group of latches (interruption request hold latches) holding the value of the interruption request field of the SD in executing the guest VM, are provided in the CPU and the interruption request hold latches are set when executing the SIE instruction. Further, a circuit causing an interruption to a microprogram of the CPU when the interruption request hold latch is "1" when executing the guest VM and a bit corresponding to the system mask of the guest PSW is ON, is provided along with step 37 in FIG. 3. In the second conventional technology the interruption request hold latch is updated in, for example, when executing the guest VM at pertinent periods of time. Thus, according to this conventional technology it is not necessary to check the interruption request field in the SD in executing the system mask change instruction of the guest whereby the processing function of the system mask change instruction of the guest is promoted.

In the above-described first conventional technology, it is necessary to check the presence or absence of the IO interruption request and check whether the condition of the interception is established by the IO interruption request, in reference to the SD in the main storage (or a temporal copy of the SD in a local storage of the CPU) at each of the system mask change instructions of the guest VM as described above, whereby the processing function of the system mask change instruction of the guest is considerably deteriorated.

In the second conventional technology in a multiprocessor construction, the presence or absence of the interruption request in the SD is periodically checked in a guest VM being executed in one CPU to reflect change of interruption request in the SD by another CPU. Thereby, the above-mentioned check processing is caused even in a case where there is no change in the interruption request, which constitutes an overhead in processing the guest instruction. Further, in a case where the period of time for checking is prolonged to reduce the overhead, the change of the interruption request is not immediately reflected, which gives rise to a delay in processing the interruption request.

SUMMARY OF THE INVENTION

It is an object of the present invention to provide a guest execution control system, method and computer process for accelerating a guest instruction processing by automatically informing a guest virtual machine being executed when execution instruction information of an SD including interruption request information corresponding to the guest virtual machine has been changed thereby eliminating the need for the guest virtual machine to continually monitor the SD to detect when a change has occurred.

It is another object of the present invention to provide a guest execution control system, method and computer process for a virtual machine system, wherein the processing function of the change instruction of the guest system mask is accelerated as fast as in the case of a host and further, in a multiprocessor structure, by immediately reflecting the change of the interruption request information in the SD by another CPU on a guest VM being executed at the moment of the change thereby eliminating the overhead necessary for periodically checking the presence or absence of the interruption request in the SD.

To achieve the above-mentioned objects, according to a first aspect of the present invention, there is provided a guest execution control system for a virtual machine system including a main storage for holding a state descriptor of a guest virtual machine, and a plurality of instruction processors each starting execution of the guest virtual machine by executing an execution start instruction for the guest virtual machine. Execution instruction information including an interruption request field in the state descriptor indicating whether execution of the guest virtual machine is to be finished is changed when a state of the virtual machine satisfies a predetermined condition during execution of the guest virtual machine. The execution instruction information is held at an address in the main storage.

The system includes a circuit which compares an address in the main storage of information being changed with the address in the main storage of the execution instruction information, and informs the guest virtual machine being executed that the execution instruction information has been changed when the address in the main storage of information being changed is the same as the address in the main storage of the execution instruction information. The guest execution control method and computer process of the present invention performs the above-described comparing and informing steps.

The circuit includes a first register for holding an address in the main storage being updated, a second register for holding an address in the main storage of the execution instruction information of the state descriptor of the guest virtual machine, a comparator for comparing the addresses held in the first register and the second register, and an informing circuit for informing the guest virtual machine being executed that the execution instruction information has been changed when the address being held in the first register is the same as the address being held in the second register. Thereafter, the changed value of the execution instruction information is provided to the guest virtual machine being executed by another circuit.

According to a second aspect of the present invention, there is provided the guest execution control system for a virtual machine system according to the first aspect, further including a plurality of buffer memories corresponding to the plurality of instruction processors. Each buffer memory stores a copy of data stored in the main storage and an invalidation circuit which invalidates the copy of data of the main storage region in the buffer memory when information at an address in the main storage has been changed. The guest execution control method and computer process performs the above-described step of invalidating the copy of data in the buffer memories.

By use of the above-described features of the present invention interruption request information included in the execution instruction information from the VMCP executing a guest VM is automatically monitored. Therefore, it is not necessary to periodically check the interruption request information when executing the system mask change instruction of the guest or executing the guest VM. In a case where the interruption request formation in the SD is changed, the change is immediately reflected on the guest VM and accordingly, the processing of the interruption request is not delayed. Further, unnecessary overhead is eliminated since it is not necessary to periodically check the presence or absence of an interruption request. In this way the processing function of the guest VM can be more efficiently used.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

A detailed explanation will be given of the embodiments of an information processing device according to the present invention in reference to the drawings.

Figure 1:
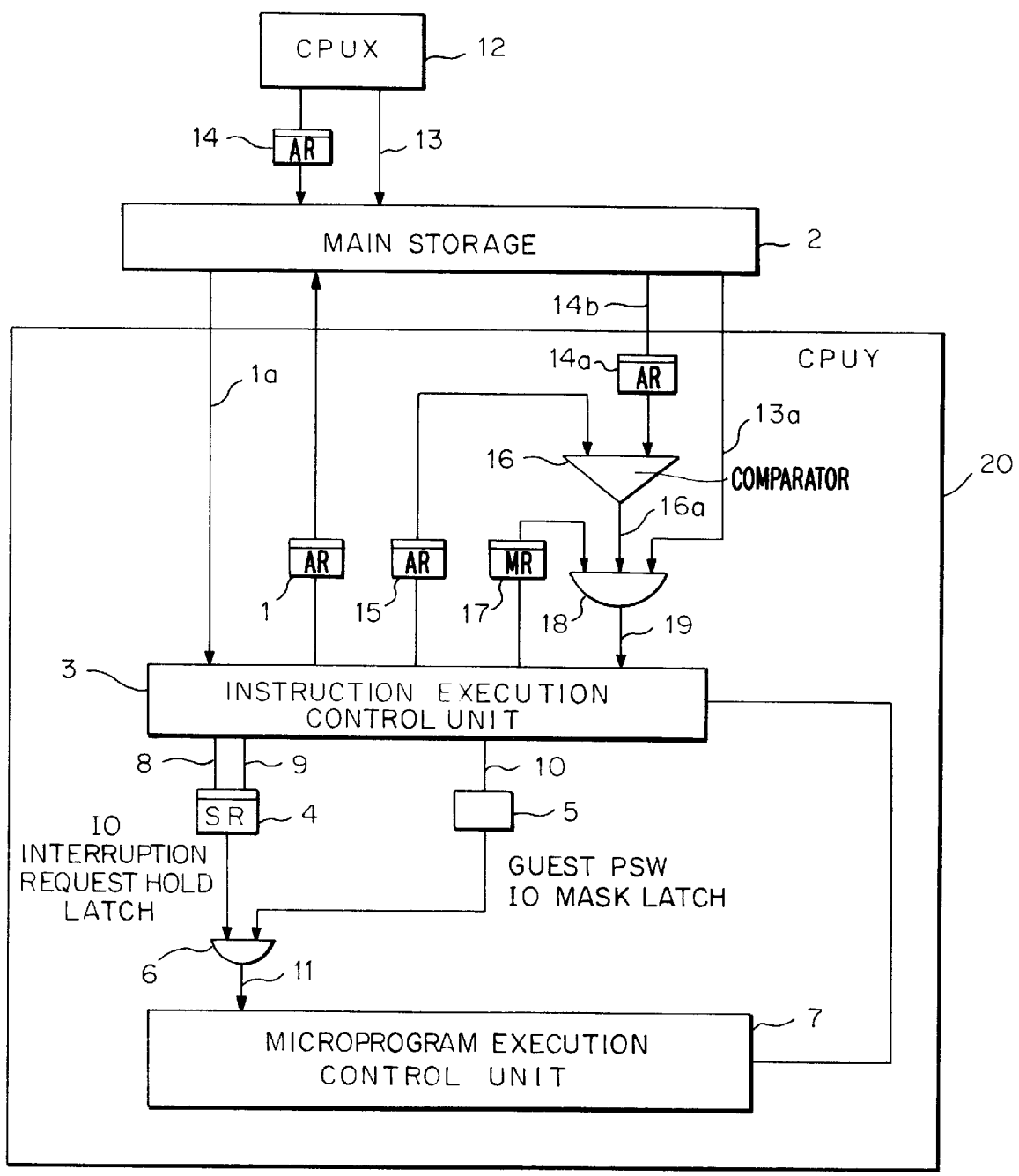
FIG. 1 is a schematic diagram illustrating a structure of an embodiment of the present invention where the SD is stored in main storage.
Figure 2:
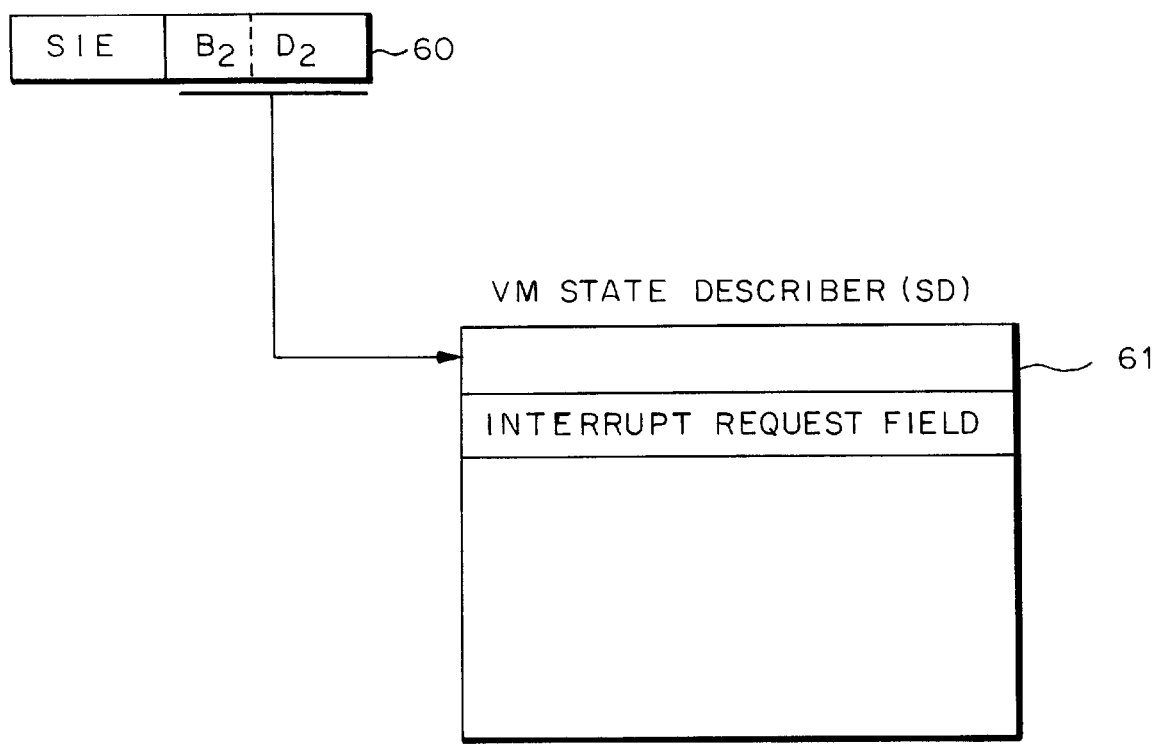
FIG. 2 is a diagram illustrating an instruction format of a virtual machine execution start instruction (SIE instruction)
Figure 3:
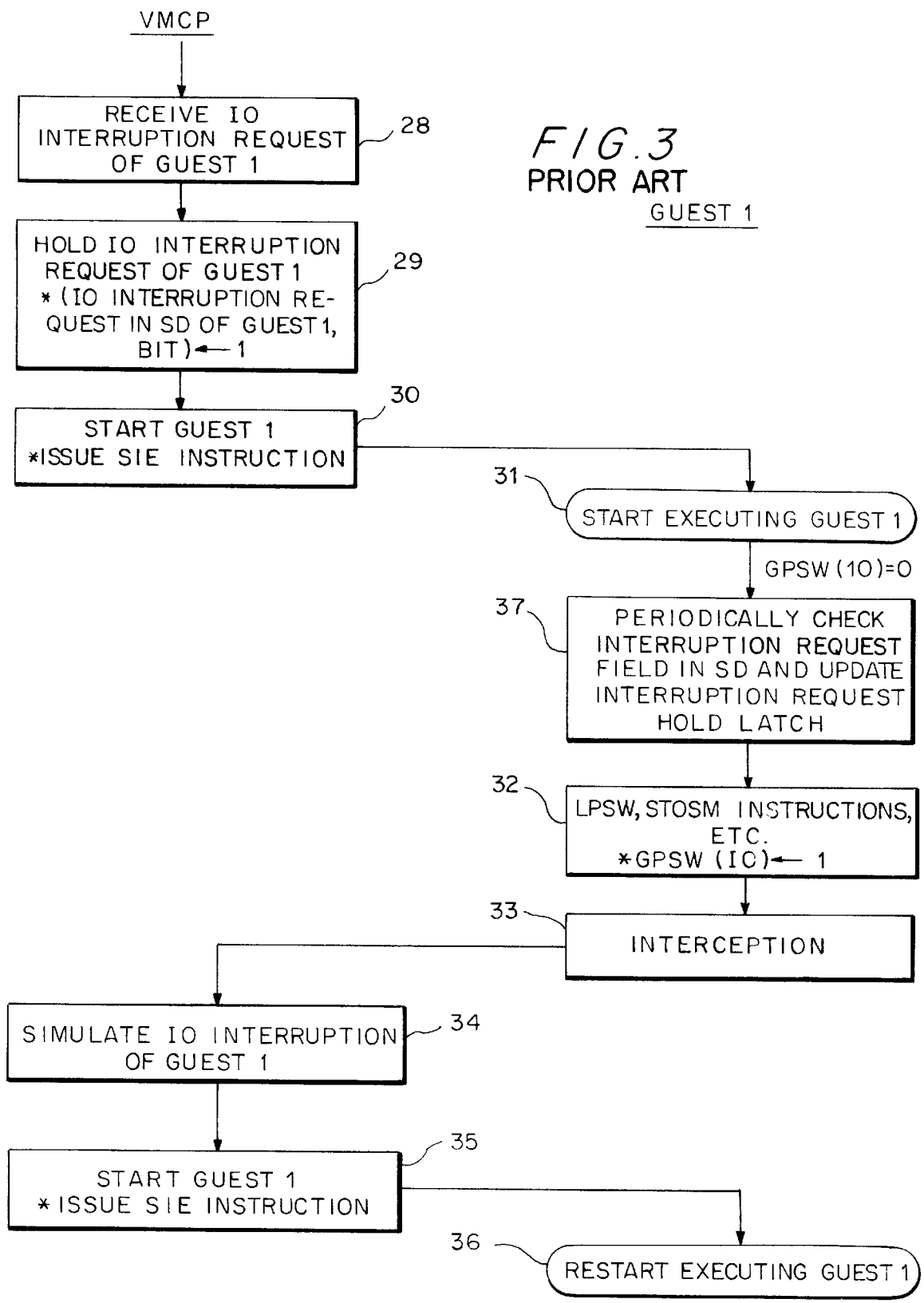
FIG. 3 is a flow chart of a processing in a case where a guest interruption is held by a host virtual machine control program (VMCP) in the conventional technology.
Figure 4:
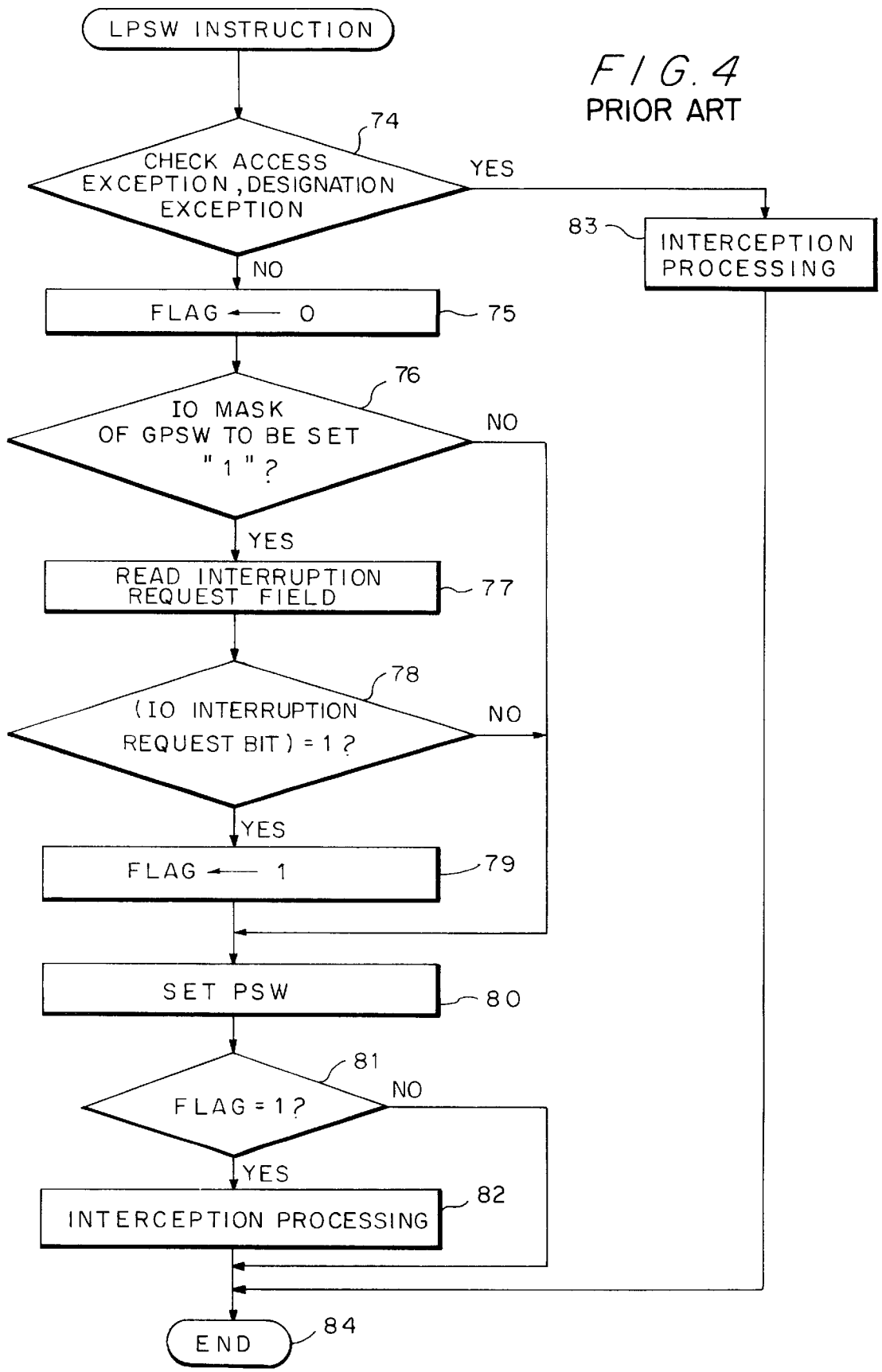
FIG. 4 is a flow chart of a processing of a load PSW instruction in the conventional technology.

FIG. 1 is a schematic diagram of a first embodiment of the present invention. In FIG. 1, numeral 1 designates an address register, numeral 2 designates a main storage, numeral 1a designates a signal containing data read from the main storage 2, numeral 3 designates an instruction execution control unit, numeral 4 designates an IO interruption request hold latch, numeral 5 designates a guest PSW IO mask latch and numeral 6 designates an AND gate for calculating a logical product of the IO interruption request hold latch 4 and the guest PSW IO mask latch 5.

Numeral 12 designates CPUX, numeral 20 designates CPUY, numeral 13 designates a write request signal from CPUX 12 to the main storage 2 and numeral 14 designates an address register for holding a write address of the main storage 2 corresponding to the write request signal 13.

Numeral 13a designates a signal for indicating that writing has been performed to the main storage 2 and numeral 14a designates an address register for holding a write address corresponding to the signal 13a. The write address is provided to the address register 14a as an address signal 14b. Numeral 15 designates an address register holding an address of an interruption request field in the SD.

Numeral 16 designates a comparator for detecting whether a write address with regard to the main storage 2 held in the address register 14a and an address of an interruption request field in the SD held in the address register 15 are the same. If the write address held in the address register 14a is the same as the address of the interruption request field in the SD held in the address register 15, then the interruption request field in the SD has been updated. When the interruption request field in the SD has been updated the comparator 16 outputs a signal 16a indicating that a change in the interruption request field of the SD has occurred. Numeral 17 designates a mode register for storing information indicating whether the guest VM is being executed. Numeral 18 designates an AND gate for calculating a logical product between the signal 13a indicating that writing has been performed to the main storage 2, the signal 16a from the comparator 16 and the information stored in the mode register 17.

Numerals 4 through 6 concern the guest IO interruption. Although a similar circuit may be provided to a guest external interruption, the circuit is omitted with regard thereto in this embodiment.

An output of the AND gate 6 becomes an interruption trigger 11 which instructs an interruption of a microprogram execution control unit 7. An output of the AND gate 18 is an inform signal 19 for informing the guest VM being executed that the interruption request field has been updated, which instructs the updating of the IO interruption request hold latch 4 to the instruction execution control unit 3.

Figure 5:
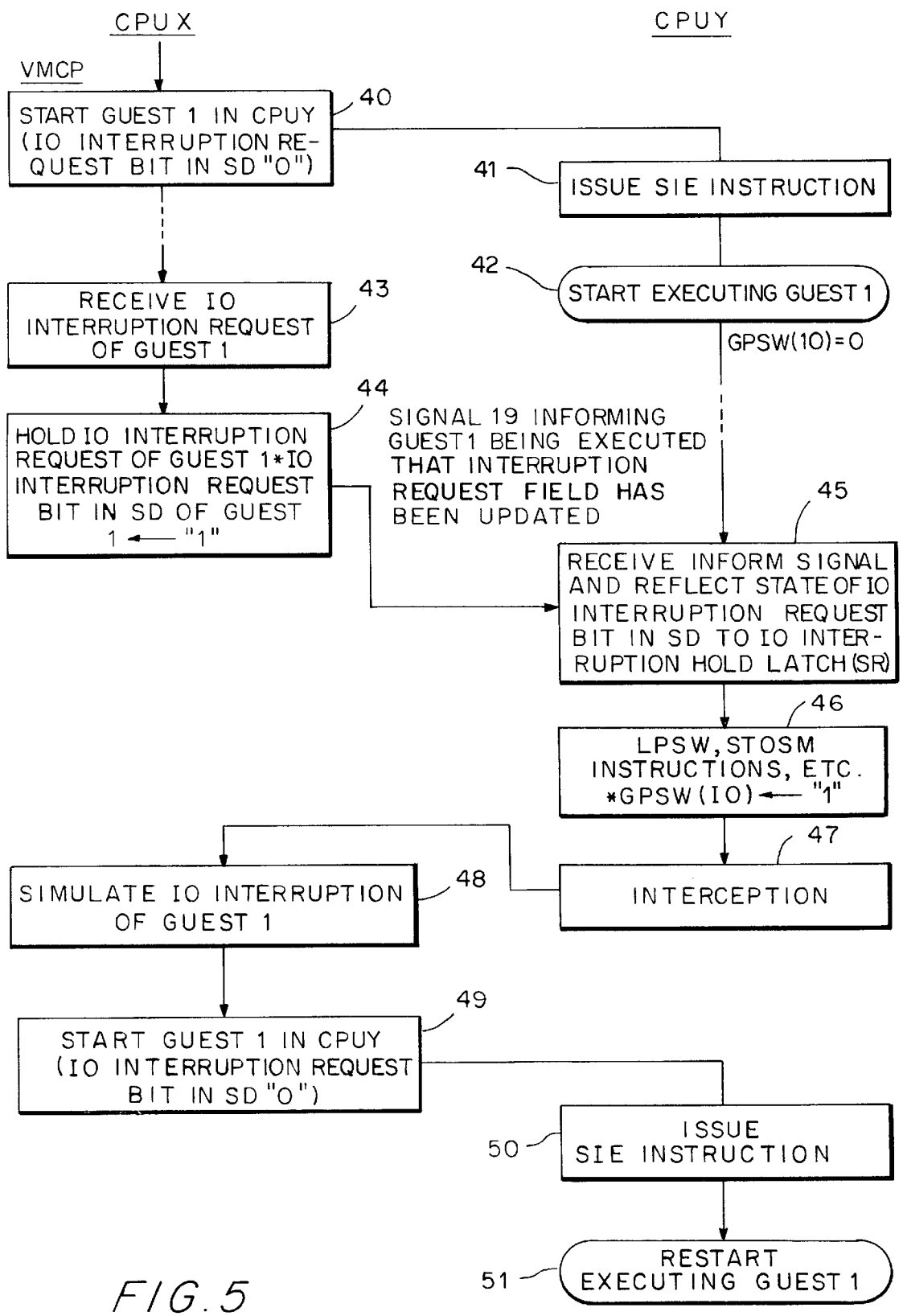
FIG. 5 is a flow chart of a processing in a case where the guest interruption is held in the VMCP according to the present invention.

Next, an explanation will be given of the operation of the first embodiment illustrated in FIG. 1 in reference to FIG. 5. In step 41 of FIG. 5 a SIE instruction is issued and Guest 1 is started in the CPUY 20. In CPUX 12 the host or other guest is operating. In processing the SIE instruction addresses designated by the B2 and D2 fields of the SIE instruction are set in the address register 1, SD is read from the main storage 2 and provided via a signal 1a and an IO interruption request bit and a guest PSW IO mask are respectively set to the IO interruption request hold latch 4 and the guest PSW IO mask latch 5 via the instruction execution control unit 3. Further, the address of the interruption request field in the SD is set to the address register 15 and the mode register 17 indicating that the guest VM is being executed is set to ON ("1").

When the VMCP of the CPUX 12 receives the IO interruption request of Guest 1 being executed in the CPUY 20 (step 43), the VMCP holds the IO interruption request of Guest 1. That is, the address of the interruption request field in the SD to be rewritten is set in the address register 14, the write request signal 13 from the CPUX 12 to the main storage 2 is set ON ("1") and the IO interruption request bit in the SD of Guest 1 in the main storage 2 is rewritten to be "1" (step 44).

After the rewriting has been completed, the main storage 2 sets the address held in the address register 14 to the address register 14a via a signal 14b and at the same time set to ON ("1") the signal 13a indicating that writing has been performed to the main storage 2.

The signal 16a output of the comparator 16 becomes "1" when the write address of the main storage 2 held in the address register 14a and the address of the interruption request field in SD held in the address register 15 are the same. The signal 16a is inputted to the AND gate 18. Since the mode register 17, signal 13a and signal 16a are "1" the output of the inform signal 19 from the AND gate 18 becomes "1". The inform signal 19 is transmitted to the instruction execution control unit 3 thereby indicating that the interruption request field in the SD has been rewritten.

The instruction execution control unit 3 sets the address of the SD in the address register 1 and reads the SD from the main storage 2 via the signal 1a. Further, the state of "1" of the IO interruption request bit in the SD read from the main storage 2 is reflected to the IO interruption request hold latch 4 (step 45). That is, the IO interruption request hold latch 4 is set via a signal 8. When the IO interruption request bit is "0", the IO interruption request hold latch 4 is reset via a signal 9. The guest PSW IO mask latch 5 is updated by the system mask operation instruction (LPSW, STOSM, SSM) of the guest VM. When the IO interruption request hold latch 4 is "1" and the guest PSW IO mask latch 5 is ON, the interruption trigger 11 becomes "1" by the AND gate 6 and the interruption is instructed to the microprogram execution control unit 7. That is, when the guest IO interruption is held by the VMCP, the IO interruption request hold latch 4 becomes "1" and the guest VM runs during a period of time when the guest PSW IO mask latch 5 is OFF. However, after the guest PSW IO mask has become ON by executing the system mask operation instruction of the guest (step 46), the interruption trigger 11 is immediately made "1" and the execution of the guest VM is finished by the interception (step 47) by interrupting the microprogram.

Figure 6:
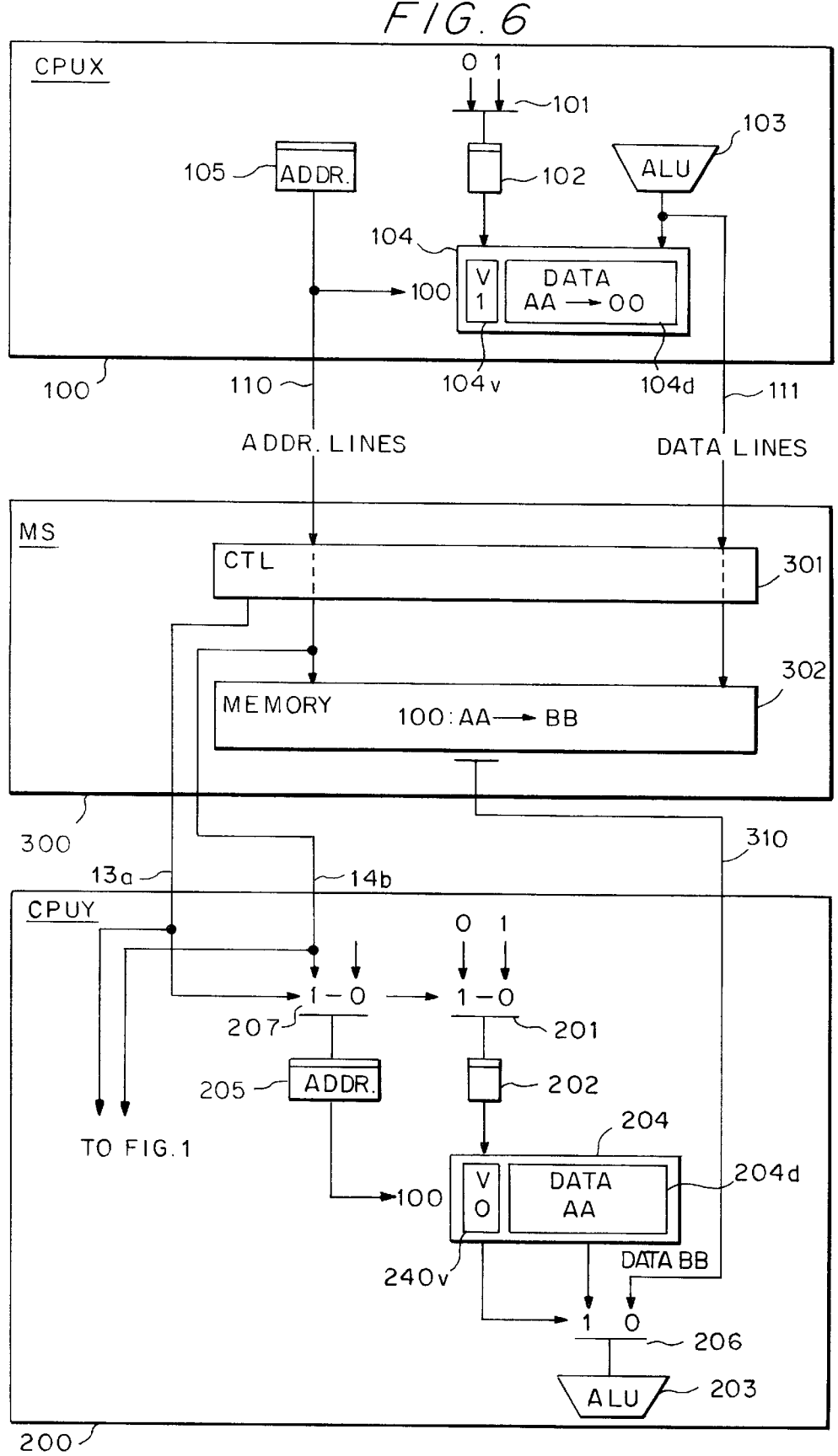
FIG. 6 is a schematic diagram illustrating a structure of another embodiment of the present invention where the SD is stored in the main storage and copies of at least a portion of the SD is in the buffer memories corresponding to the CPU's.

A second embodiment of the present invention is illustrated in FIG. 6. FIG. 6 is a schematic diagram of a second embodiment of the present invention. As illustrated in FIG. 6 numeral 100 designates CPUX, numeral 101 designates a selector for selecting one of two inputs, numeral 102 designates a buffer memory valid write data latch for holding data output from the selector 101, numeral 103 designates an arithmetic logic unit (ALU) which executes instructions within the CPUX 100, numeral 104 designates a buffer memory wherein 104d designates a data area of the buffer memory 104 for storing a copy of data in the main storage 302 and 104v is a validity indication area of the buffer memory 104 for storing data indicating whether data at particular addresses in the data area 104d are valid and numeral 105 designates an address register for storing an address to be applied to the buffer memory 104.

The address stored in the register 105 is applied to the buffer memory 104 and is output on an address lines 110. The data from the ALU is supplied to the buffer memory 104 for writing therein at the address indicated by address lines 110 and is output on data lines 111.

Numeral 300 designates a main storage, numeral 301 designates a main storage control unit for controlling the main storage 300 and numeral 302 designates the memory of the main storage 300 that stores the original copy of the data. The main storage control unit 301 in response to the address lines 110 and the data lines 111 outputs the signal 13a for indicating that writing has been performed to the main storage 300 and a signal 14b indicating an address corresponding to the signal 13a. Numeral 200 designates CPUY. Signals 13a and 13b are provided to CPUY 200 and are used in the same manner as illustrated in FIG. 1 and as described above.

CPUY 200 includes numeral 201 which designates a selector which selects one of two inputs for output which indicates the validity of corresponding data. The selector 201 selects the "0" input indicating the corresponding data is invalid if the signal 13a is "1" indicating that writing has occurred in the main storage 300. Numeral 202 designates a buffer memory valid write data latch for holding data output from the selector 201, numeral 203 designates an ALU for executing instructions in the CPUY 200, numeral 204 designates a buffer memory having a data area 204d for storing a copy of data held in the memory 302 of the main storage 300, numeral 204v designates a validity indication area of the buffer memory 204 for storing data indicating whether data at particular addresses in the data area 204d are valid, numeral 205 designates an address register for holding address data and numeral 207 designates a selector which selects one of two inputs for output to the register 205. The selector 207 selects based on the signal 13a the address input provided by the signal 14b or the "0" input. Numeral 206 designates a selector which selects one of two inputs for output to the ALU 203. The selector 206 selects either the data from the indicated address of the data area 204d of the buffer memory 204 or the data from the main storage 300 at the indicated address provided by signal 310 based on data at the indicated address held by the validity indication area of the buffer memory 204.

Next an explanation will be given of the operation of the second embodiment illustrated in FIG. 6. During operation of the second embodiment illustrated in FIG. 6 a copy of the data stored in the memory 302 of the main storage 300 is stored in each of the buffer memories 104 and 204. When CPUX 100 changes data stored at address 100 in the data area 104d of the buffer memory 104 from AA to BB by the ALU 103, the changed data from the ALU 103 is provided to the main storage 300 by data lines 111 and the address 100 of the changed data is provided by the register 105 to the main storage 300 by address lines 110. Using the address 100 from the address lines 110 and the changed data from the data lines 111 the main storage control unit 301 changes the data at address 100 from AA to BB in the memory 302. The main storage control unit 301 also outputs the address 100 of the changed data as signal 14b and indicates by signal 13a that data is being written in the main storage 300 at the address indicated by signal 14b.

In the CPUY 200, in response to signal 13a, the selector 207 selects the address 14b to be output and stored in the address register 205. Also in response to the signal 13a the selector 201 selects the invalid indicator "0" which is then stored in the buffer memory valid write data latch 202. The address 100 supplied by the address register 205 is applied to the buffer memory 204 so as to access the memory location corresponding to the address 100. In the memory location 100 in the buffer memory 204 an invalid indicator "0" is stored in the validity indication area 204v of the buffer memory 204 so as to indicate that the data AA at the memory location 100 is invalid. Thus, when the ALU 203 of CPUY 200 attempts to access the data at the address 100 the invalid indicator "0" is output from the validity indication area 204v of the buffer memory 204. The invalid indicator "0" causes the selector 206 to select the updated data BB supplied as signal 310 from the memory 302 of the main storage 300.

Thus, in the second embodiment of the present invention an invalidation circuit which includes the lines providing the signals 13a, 146, 110, 111 and 310, selectors 101, 201, 206 and 207, the buffer memory valid write data latch 202, and the registers 105 and 205 are provided for invalidating the copy of the data of the main storage 300 stored in the buffer memory 204 when information at an address in the main storage has been changed. However, the same invalidation circuit, although not shown, can be provided for invalidating the copy of the data of the main storage 300 stored in buffer memory 104 when data at an address in the main storage 300 has been changed by the CPUY 200.

According to the above-described features of the first and second embodiments of the present invention, even in a case where the guest interruption holding of the VMCP is performed in executing the guest VM, the rewriting of the interruption request field is informed to the guest VM being executed in synchronism with the rewriting of the interruption request field in the SD. Therefore, it is not necessary to check the interruption request field during execution of the control instruction of the guest VM or periodically check the interruption request field. Thus, the processing of the interruption request is not delayed and the promotion of the processing function of the guest VM can be achieved.

The above-described features of the first and second embodiments of the present invention can be provided by a computer process performed on or with the aid of a computer executing a computer program or microprogram. The computer program or microprogram has a plurality of code sections which correspond to the flow chart illustrated in FIG. 5. More particularly, the computer program or microprogram has a plurality of code sections which correspond to the comparing and informing operations described above with respect to the circuit forming the guest execution control system.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. A guest execution control system for a virtual machine system having a main storage for holding a state descriptor of a guest virtual machine, and a plurality of instruction processors each starting execution of the guest virtual machine by executing an execution start instruction for the guest virtual machine, wherein execution instruction information in the state descriptor indicating whether execution of the guest virtual machine is to be finished is changed when a state of the virtual machine satisfies a predetermined condition during execution of the guest virtual machine, said execution instruction information being held at an address in the main storage, said system comprising:

a circuit which compares an address in the main storage of information being changed with the address in the main storage of the execution instruction information in the state descriptor, and informs the guest virtual machine being executed that the execution instruction information has been changed when said address in the main storage of information being changed is the same as the address in the main storage of the execution instruction information.

2. A guest execution control system according to claim 1, wherein said circuit comprises:

a register for holding said address in the main storage of information being changed.

3. A guest execution control system according to claim 1, wherein said circuit comprises:

a register for holding the address in the main storage of the execution instruction information.

4. A guest execution control system according to claim 2, wherein said circuit comprises:

a second register for holding the address in the main storage of the execution instruction information.

5. A guest execution control system according to claim 4, wherein said circuit comprises:

a comparator for comparing said address in the main storage of information being changed held by said register with the address in the main storage of the execution instruction information held by said second register.

6. A guest execution control system according to claim 1, wherein said circuit comprises:

an informing circuit for informing the guest virtual machine being executed that the execution instruction information has been changed when said address in the main storage of information being changed is the same as the address in the main storage of the execution instruction information.

7. A guest execution control system according to claim 5, wherein said circuit comprises:

an informing circuit for informing the guest virtual machine being executed that the execution instruction information has been changed when said address in the main storage of information being changed is the same as the address in the main storage of the execution instruction information.

8. A guest execution control system according to claim 1, further comprising:

a plurality of buffer memories corresponding to said instruction processors, each buffer memory storing a copy of data stored in the main storage; and an invalidation circuit which invalidates the copy of the data stored in the main storage in each buffer memory when information at an address in the main storage has been changed.

9. A guest execution control system according to claim 1, further comprising:

another circuit which informs the guest virtual machine being executed of data of the execution instruction information which has been changed.

10. A guest execution control method for a virtual machine system having a main storage for holding a state descriptor of a guest virtual machine, and a plurality of instruction processors each starting execution of the guest virtual machine by executing an execution start instruction for the guest virtual machine, wherein execution instruction information in the state descriptor indicating whether execution of the guest virtual machine is to be finished is changed when a state of the virtual machine satisfies a predetermined condition during execution of the guest virtual machine, said execution instruction information being held at an address in the main storage, said guest execution control method comprising the steps of:

comparing an address in the main storage of information being changed with the address in the main storage of the execution instruction information in the state descriptor; and informing the guest virtual machine being executed that the execution instruction information has been changed when said address in the main storage of information being changed is the same as the address in the main storage of the execution instruction information.

11. A guest execution control method according to claim 10, wherein a register is provided for holding said address in the main storage of information being changed.

12. A guest execution control method according to claim 10, wherein a register is provided for holding the address in the main storage of the execution instruction information.

13. A guest execution control method according to claim 11, wherein a second register is provided for holding the address in the main storage of the execution instruction information.

14. A guest execution control method according to claim 13, wherein a comparator is provided for comparing said address in the main storage of information being changed held by said register with the address in the main storage of the execution instruction information held by said second register.

15. A guest execution control method according to claim 10, wherein an informing circuit is provided for informing the guest virtual machine being executed that the execution instruction information has been changed when said address in the main storage of information being changed is the same as the address in the main storage of the execution instruction information.

16. A guest execution control method according to claim 14, wherein an informing circuit is provided for informing the guest virtual machine being executed that the execution instruction information has been changed when said address in the main storage of information being changed is the same as the address in the main storage of the execution instruction information.

17. A guest execution control method according to claim 10, further comprising the steps of:
wherein a plurality of buffer memories corresponding to said instruction processors are provided, each buffer memory storing a copy of data stored in the main storage; and
invalidating the copy of the data stored in the main storage in each buffer memory when information at an address in the main storage has been changed.

18. A guest execution control method according to claim 10, further comprising the steps of:
informing the guest virtual machine being executed of data of the execution instruction information which has been changed.

19. A computer process for controlling guest execution in a virtual machine system having a main storage for holding a state descriptor of a guest virtual machine, and a plurality of instruction processors each starting execution of the guest virtual machine by executing an execution start instruction for the guest virtual machine, wherein execution instruction information in the state descriptor indicating whether execution of the guest virtual machine is to be finished is changed when a state of the virtual machine satisfies a predetermined condition during execution of the guest virtual machine, said execution instruction information being held at an address in the main storage, comprising:
a computer program performed on or with the aid of a computer, the computer program including:
causing the computer, using a first code, to compare an address in the main storage of information being changed with the address in the main storage of the execution instruction information; and
causing the computer, using a second code, to inform the guest virtual machine being executed that the execution instruction information has been changed when said address in the main storage of information being changed is the same as the address in the main storage of the execution instruction information.

20. A computer process according to claim 19, wherein a register is provided for holding said address in the main storage of information being changed.

21. A computer process according to claim 19, wherein a register is provided for holding the address in the main storage of the execution instruction information.

22. A computer process according to claim 20, wherein a second register is provided for holding the address in the main storage of the execution instruction information.

23. A computer process according to claim 19, wherein a comparator is provided for comparing said address in the main storage of information being changed with the address in the main storage of the execution instruction information.

24. A computer process according to claim 22, wherein a comparator is provided for comparing said address in the main storage of information being changed held by said register with the address in the main storage of the execution instruction information held by said second register.

25. A computer process according to claim 19, wherein an informing circuit is provided for informing the guest virtual machine being executed that the execution instruction information has been changed when said address in the main storage of information being changed is the same as the address in the main storage of the execution instruction information.

26. A computer process according to claim 24, wherein an informing circuit is provided for informing the guest virtual machine being executed that the execution instruction information has been changed when said address in the main storage of information being changed is the same as the address in the main storage of the execution instruction information.

27. A computer process according to claim 19, further comprising:
wherein a plurality of buffer memories corresponding to said instruction processors are provided, each buffer memory storing a copy of data stored in the main storage; and
said computer program further including:
causing the computer, using a third code, to invalidate the copy of the data stored in the main storage in each buffer memory when information at an address in the main storage has been changed.

28. A computer process according to claim 19, the computer program further comprising:
causing the computer, using a third code, to inform the guest virtual machine being executed of data of the execution instruction information which has changed.

29. A guest execution control system according to claim 1, wherein said circuit is located in at least one of said plurality of instruction processors.

30. A guest execution control method according to claim 10, wherein said comparing and informing steps are performed in at least one of said plurality of instruction processors.

31. A guest execution control method according to claim 1, wherein said circuit automatically informs the guest virtual machine being executed when the execution instruction information has been changed to thereby eliminate a need for the guest virtual machine to continually monitor the state descriptor to detect such a change.

32. A guest execution control method according to claim 11, wherein said informing step is automatically performed to thereby eliminate a need for the guest virtual machine to continually monitor the state descriptor to detect when a change in the execution instruction information has occurred.

33. A guest execution control system according to claim 1, wherein said execution instruction information includes interruption request information corresponding to the guest virtual machine, wherein said address in the main storage of the execution instruction information includes an address of the interruption request information stored in the main storage, and wherein said circuit informs the guest virtual machine being executed that the interruption request information has been changed when said address of the main storage of information being changed is the same as the address of the interruption request information stored in the main storage.

34. A guest execution control method according to claim 11, wherein said execution instruction information includes interruption request information corresponding to the guest virtual machine, wherein said address in the main storage of the execution instruction information includes an address of the interruption request information stored in the main storage, and wherein said circuit informs the guest virtual machine being executed that the interruption request information has been changed when said address of the main storage of information being changed is the same as the address of the interruption request information stored in the main storage.

36. A guest execution control system according to claim 3, wherein the address in the main storage of the execution instruction information remains constant during operation of an instruction processor in which said circuit is located.

36. A guest execution control method according to claim 11, wherein the address in the main storage of the execution instruction information remains constant during operation of an instruction processor in which said circuit is located.

37. A guest execution control system where a virtual machine system, which includes a plurality of instruction processors and a main storage for storing a state descriptor of a guest virtual machine, each of said plurality of instruction processors starting execution of the guest virtual machine by executing an execution start instruction for the guest virtual machine, said state descriptor including interruption request information, stored at an address of the main storage, indicating whether execution of the guest virtual machine is to be finished, said interruption request information being updated when a state of the virtual machine satisfies a predetermined condition during execution of the guest virtual machine, said system comprising:

a first register for storing an address of the main storage corresponding to information which has been updated as a result of execution of the guest virtual machine;

a second register for storing an address corresponding to a location in the main storage where the interruption request information is stored; and a circuit which compares the address in the first register with the address in the second register and then informs the guest virtual machine being executed that the interruption request information has been updated when the address of the first register agrees with the address of the second register, wherein the circuit, first register, and second register are located within one of said plurality of instruction processors.

* * * * *